Aug. 14, 1945.  T. L. FAWICK  2,382,303
METHOD OF MAKING CRANK-CASES
Filed April 26, 1944  3 Sheets-Sheet 1

INVENTOR.
THOMAS L. FAWICK
BY
Willard D. Eakin
ATTORNEY

INVENTOR.
THOMAS L. FAWICK
BY Willard A. Eaflin
ATTORNEY

INVENTOR.
THOMAS L. FAWICK
BY
ATTORNEY.

Patented Aug. 14, 1945

2,382,303

UNITED STATES PATENT OFFICE 2,382,303

METHOD OF MAKING CRANKCASES

Thomas L. Fawick, Akron, Ohio

Application April 26, 1944, Serial No. 532,760

3 Claims. (Cl. 29—156.4)

This invention relates to methods for making crank cases for internal combustion engines. It is of especial value in quantity production of crank cases for the motors of air-craft, wherein lightness, strength and accuracy of dimensions are of utmost importance. Some of the subject matter disclosed in this application is described and claimed in my co-pending application Ser. No. 428,851, filed January 30, 1942, of which this application is a continuation-in-part.

Because of the above mentioned requisites, and because the several portions of the crank case have to be thin but extensive in several directions, an inordinate amount of machining of large aluminum or steel forgings has been required in the procedure that has been for a long time, and still is, the general practice, in spite of the present urgent need for saving time, labor and shipping costs and for reducing waste of materials in machining operations.

The chief objects of this invention are economy of time and of labor, avoidance of the high cost of shipping large and heavy parts from city to city for the forging and machining operations, the reduction of the amount of machining waste, and the provision of accuracy, lightness and strength in the finished product.

Figure 1:
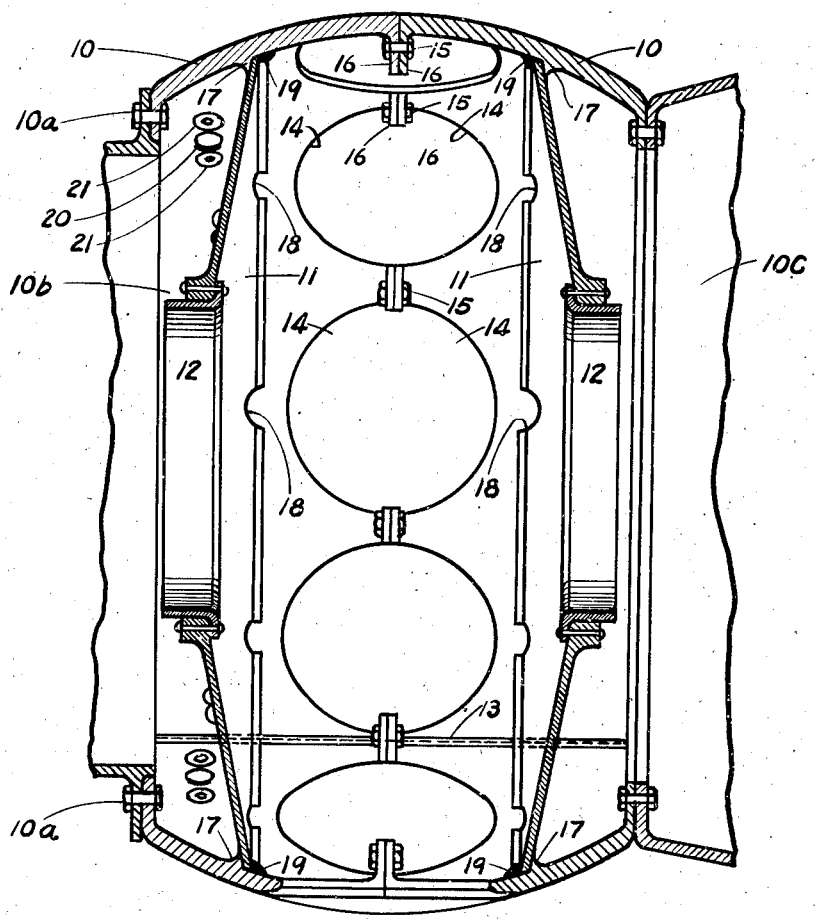
Fig. 1 is a fragmentary axial section of a crank case, for a single bank of cylinders, made in accordance with my invention in its preferred form.

Referring first to Fig. 1, the crank case there shown comprises two annular, somewhat bell-shaped, outer members 10. 10 and two centrally apertured, disc-like, conical, bearing-support members 11, 11, which have mounted therein centrally apertured, flanged, annular, seating members 12, 12 for the crank-shaft bearings, the members 10 being adapted to be secured as by bolts $10^a$, $10^a$ to a reduction gear and propeller-bearing housing $10^b$ and to an engine support $10^c$, respectively.

Heretofore the crank case, having portions corresponding to the four members 10, 10 and 11, 11, have been made integral with each other, by machining of a single metal forging, and it is manifest from contemplation of the final shape of such a member that the machining job is expensive, being wasteful of time, labor, material, and shipping costs.

Figure 4:
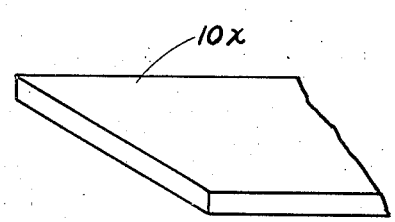
Fig. 4 is a fragmentary perspective view of a piece of rolled metal as it appears at an early stage in the preferred procedure for forming a part of the crank case.
Figure 5:
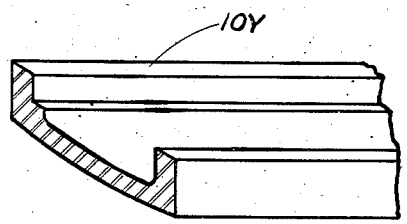
Fig. 5 is a fragmentary perspective view of the same piece as it appears at a later stage.
Figure 6:
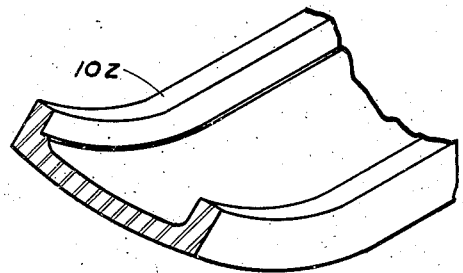
Fig. 6 is a fragmentary perspective view showing the same piece at a still later stage.

In the practice of my invention each of the members 10 is hot-rolled longitudinally to approximately its final channeled cross-sectional form, in straight lengths, as illustrated at $10^x$ in Fig. 4 and $10^y$ in Fig. 5 but with allowance for the relatively small amount of machining required. The longitudinal hot-rolling provides a longitudinal grain in the metal which in the final product provides high strength against circumferential strains. In this rolling operation each of the straight lengths can be long enough to provide one or several of the members 10. A single unit of the channeled stock of such length as to provide one of the members 10 being thus provided, it is then rolled in circular form, as illustrated at $10^z$ in Fig. 6, and made endless by welding as at 13 (see Fig. 1).

Each is then formed with semicircular notches or half-holes 14, 14 in its margin of larger diameter, as by burning or "cutting" with a flame torch, with allowance for a relatively small amount of machining, to provide holes for the mounting of the engine cylinders when two of the members 10 are secured together as shown, by bolts 15, 15 extending through holes bored in lugs 16, 16 which are the remaining portions, after the hole cutting operation, of annular internal flanges which are formed on the members 10 in the rolling operations.

Before the members 10 are thus bolted together, however, they are sized in suitable dies, and each has mounted in it one of the bearing-support disc-like members 11.

Figure 7:
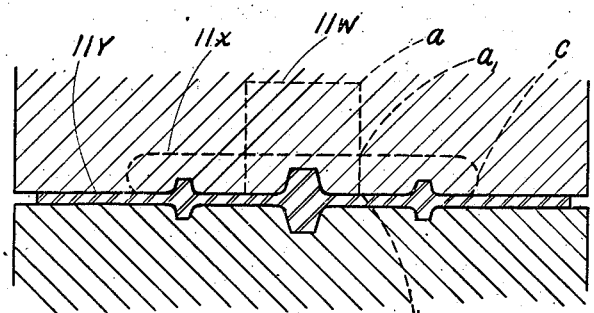
Fig. 7 is a sectional view of forging dies, with the work therein, illustrating the preferred procedure for forming another part of the crank case.

Each of the members 11 is made by forging a billet, shown in dotted lines $11^w$ and $11^x$ in Fig. 7, which preferably has its greatest dimension in the direction of the blows of the hammer, for providing a pronounced radial grain in the metal of the resulting blank $11^y$ for the sake of strength.

Figure 8:
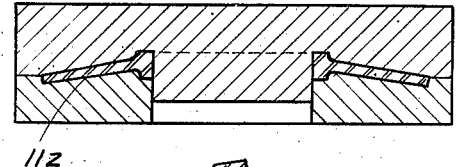
Fig. 8 is a sectional view of stamping dies, with the work therein, illustrating the preferred procedure for further shaping the part that is shown in Fig. 7.
Figure 8:
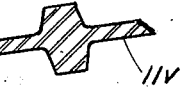

The production of such radial grain can be visualized from the fact that as the billet is forged it changes from the shape $11^x$ to progressively more flattened shapes such as the shape $11^y$ and that the vertical dimension $a$—$b$ along its surface in $11^w$ becomes the greater dimension $a'$—$c$—$b$ in $11^x$, such increases being greater in percentage than the simultaneous increases of circumference. After they are hammered approximately to size and shape the members 11 are brought, as shown at $11^z$ in Fig. 8, to a closer approximation of their final conical form by pressing them in dies, after which they are centrally bored for reception of the bearing seats 12 and are machined at their outer peripheries to fit within the respective members 10 and against respective annular shoulders 17, 17 formed on the inner faces of the members 10. The central holes can be roughly formed by the punching out of a disc $11^v$, Fig. 8, in the die-shaping operation.

Because the outer diameter of each member 11 is greater than the inner diameter of the flange of which the lugs 16 are residual parts, each member 11 is notched as at 18, 18 to permit it to be inserted in the member 10, from the larger end of the latter, in spite of the presence of the lugs 16.

The members 11, being mounted in the respective members 10, are then secured in place, preferably by welding, at 19, 19, after which the assemblies comprising the members 10, 11 and 12 are bolted to each other, the cylinder holes providing access for the bolting operation.

Holes 20 for the valve push-rods and apertured flats 21 for the mounting of the push-rod guides can be formed at any suitable stage.

Such machining as may be desirable is performed at suitable stages of the procedure but it is manifest that but very little machining is required as compared with the procedure heretofore employed, as above described, with the result that great economy of time, labor, material and shipping costs is provided.

Figure 2:
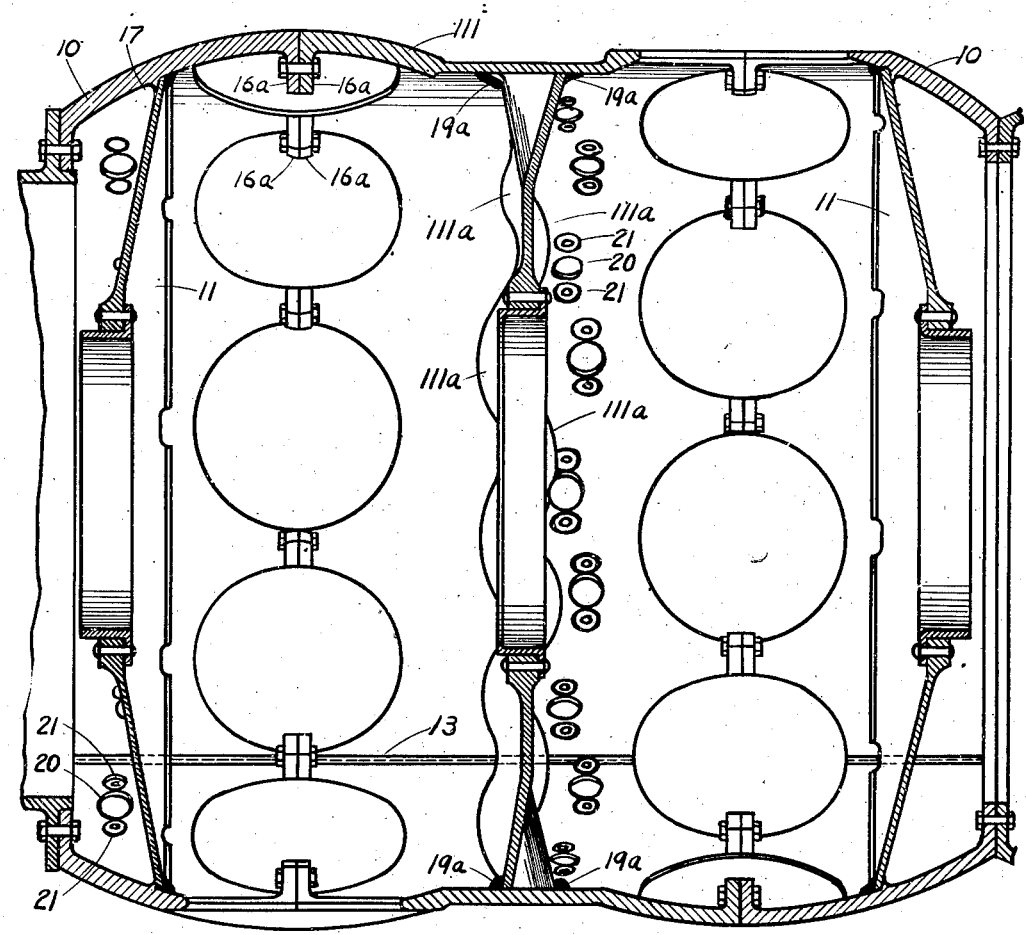
Fig. 2 is a fragmentary axial section of a crank case, for two banks of cylinders, made in accordance with my invention in its preferred form.
Figure 3:
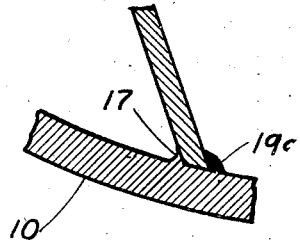
Fig. 3 is a fragmentary section, on a larger scale, of parts shown in Figs. 1 and 2.

The assembly shown in Fig. 2 corresponds substantially to that shown in Fig. 1, except that, for two banks of cylinders, the radially outer portion of the case comprises two members 10, 10, corresponding to the members 10 of Fig. 1, and between them a member 110 suitably formed, by corresponding procedure, to mate with the members 10 embracing it.

Each of the members 10 of Fig. 2 has mounted in it a conical, disc-like, bearing-support member 11, made and mounted in the same way as in Fig. 1, and at its middle the member 110 has a somewhat similar member, 111, mounted in it in the same way except that the member 111 is fluted in its radially outer portion, with the flutes, $111^a$, $111^a$, of increasing depth toward its outer periphery, and is held in place by welding shown at $19^a$, $19^a$, on both sides of its outer margin, the fluting thus providing a high degree of strength. As the sinuous welds $19^a$ provide strong anchorage of the member 111 to the member 110 a sinuous shoulder on the latter is not required and consequently the member 110 can be economically formed by substantially the same rolling operations and further procedure that are above described as to the members 10 of Fig. 1.

As the member 111 fits against a cylindrical inner face of the member 110 which is of substantial width and as the latter's lugs $16^a$, $16^a$, are a considerable distance apart, the member 111 can be mounted in the member 110 without being formed with notches in its outer margin.

The invention provides the advantages that are set out in the above statement of objects and other modifications are possible without sacrifice of all such advantages and without departure from the scope of the appended claims.

I claim:

1. A method of making a crank-case for an internal combustion engine which comprises applying rolling pressure by longitudinal progression to respective masses of metal and thereby producing two longitudinally grained metal strips, bending each to ring form and joining its ends by welding to provide two annular shell members having circumferential grain, producing two radially grained bearing support members by forging a billet, for each, initially having a relatively large dimension in the direction of the hammer blows, mounting the bearing-support members respectively in and securing them respectively to the inner surfaces of the shell members, and securing an annular margin of one of the shell members to an annular margin of the other.

2. A method of making a crank-case for an internal combustion engine which comprises applying rolling pressure by longitudinal progression to respective masses of metal and thereby producing two longitudinally grained metal strips, bending each to ring form and joining its ends by welding to provide two annular shell members having circumferential grain, producing two radially grained bearing-support members by forging a billet, for each, initially having a relatively large dimension in the direction of the hammer blows, mounting the bearing-support members respectively in and securing them respectively to the inner surfaces of the shell members, and securing an annular margin of one of the shell members to an annular margin of the other; the method including the step of forming respective circumferential series of registerable notches in the said margins of the two shell members before the two said margins are secured together, so that the notches register in pairs to form a circumferential series of cylinder holes in the resulting assembly.

3. A method of making a crank-case for an internal combustion engine which comprises applying rolling pressure by longitudinal progression to respective masses of metal and thereby producing two longitudinally grained metal strips, bending each to ring form and joining its ends by welding to provide two annular shell members having circumferential grain, producing two radially grained bearing-support members by forging a billet, for each, initially having a relatively large dimension in the direction of the hammer blows, mounting the bearing-support members respectively in and securing them respectively to the inner surfaces of the shell members, and securing an annular margin of one of the shell members to an annular margin of the other, each of the shell members being formed, in the rolling step, with an internal marginal attachment flange and said flange being bent to ring form as an integral unit with the rest of the shell member.

THOMAS L. FAWICK.